United States Patent
Matsumoto et al.

(10) Patent No.: US 6,316,720 B1
(45) Date of Patent: Nov. 13, 2001

(54) OPENING SHIELD PLATE FOR ELECTROLYTE CAPACITOR HAVING INNER ANNULAR PFA PORTION AND OUTER ANNULAR AL PORTION

(75) Inventors: Kenji Matsumoto; Yoshio Yamamoto; Kazuo Andou, all of Wako (JP); Jo Matsune, Miyato-Nihonmatsu (JP)

(73) Assignees: Honda Giken Kogyo Kabushiki Kaisha; NOK Corporation, both of Tokyo (JP)

( * ) Notice: Subject to any disclaimer, the term of this patent is extended or adjusted under 35 U.S.C. 154(b) by 0 days.

(21) Appl. No.: 09/436,405

(22) Filed: Nov. 9, 1999

(30) Foreign Application Priority Data

Nov. 10, 1998 (JP) .................................................. 10-318578

(51) Int. Cl.$^7$ ...................................................... H05K 9/00
(52) U.S. Cl. ............................................................ 174/35 R
(58) Field of Search ..................................... 174/32, 35 R, 174/35 C, 35 MS

(56) References Cited

FOREIGN PATENT DOCUMENTS 621222    6/1994    (JP) .

*Primary Examiner*—Edward H. Tso
(74) *Attorney, Agent, or Firm*—Dykema Gossett PLLC

(57) ABSTRACT

To enhance the bondability or the sealability between an opening shield plate and a capacitor case and between a resin made opening shield member and an aluminum terminal, and to effectively suppress a leakage of electrolyte liquid from these interfaces, an opening shield plate including a resin made opening shield member bonded to an outer circumference of an aluminum terminal and an aluminum made opening shield member bonded to said resin made opening shield member, wherein said shield resin made opening shield member is made of PFA resin, and said aluminum made opening shield member is welded to a capacitor case.

2 Claims, 4 Drawing Sheets

OPENING SHIELD PLATE FOR ELECTROLYTE CAPACITOR HAVING INNER ANNULAR PFA PORTION AND OUTER ANNULAR AL PORTION

BACKGROUND OF THE INVENTION

The present invention relates to an opening shield plate used as an opening shield lid of an electrolyte capacitor.

A opening shield plate 51 shown in FIG. 6 is conventionally known and structured as follows.

Namely, first of all, a resin made opening shield member 53 in the form of a plate to be pressed to fix to a circumferential edge portion of an upper opening portion of a capacitor case 52 is provided. Aluminum terminals 54 are bonded to the resin made opening shield member 53 by an insert molding. As known well, in the insert molding, the aluminum terminals 54 are inserted into a cavity of molds for molding the resin made opening shield member 53 for molding, and the two components 53 and 54 are bonded to each other simultaneously with the completion of the molding.

A packing 55 made of rubber elastic material is interposed between the capacitor case 52 and the resin made shield member 53 in order to prevent the electrolyte contained in the case 52 from leaking to the outside from the press-fit portion between the resin made opening shield member 53 and the capacitor case 52. Reference numeral 56 denotes a capacitor element received in the interior of the capacitor case 52, reference numeral 57 denotes lead lines for connecting the capacitor element 56 and aluminum terminals 54, and reference numeral 58 denotes an explosion preventing valve for releasing an excessive pressure.

However, the above-described conventional opening shield plate 51 has the following disadvantages. Namely, in the case where an electrolyte liquid is type of a high permeation, if this electrolyte permeates into the press-fit portion to be brought into contact with the packing 55, there is a fear that the packing 55 would be deteriorated relatively earlier by the chemical reaction. Accordingly, since it is impossible to sufficiently seal the electrolyte liquid only with the deteriorated packing 55, there is a fear that the electrolyte liquid would out leak from the interface between the resin made opening shield member 53 and the capacitor case 52, i.e., the interface between the opening shield plate 51 and the capacitor case 52.

Also, with respect to the interface between the resin made opening shield member 53 and the aluminum terminals 54, there is a fear that a gap would be formed gradually due to the fact that there is a difference in thermal expansion rate or thermal transfer rate between the two components 53 and 54 and the electrolyte liquid would leak out through the gap. In this connection, the present applicant has proposed the approach that a flanged portion 54a is integrally formed with an outer circumference of each aluminum terminal 54 as shown in the drawing and the flanged portion 54a is embedded within the thickness of the resin made opening shield member 53 to enhance the bondability between the two components 53 and 54 (see Utility Model Publication No. 21222/1994). However, if the bondability between the two components 53 and 54 or the sealability there between is further enhanced, this would be by far better.

SUMMARY OF THE INVENTION

In view of the foregoing, an object of the present invention is to provide an opening shield plate which enhances the bondability or the sealability between the opening shield plate and a capacitor case and between a resin made opening shield member and aluminum terminals and which can suppress effectively a leakage of electrolyte liquid from these interfaces.

In order to attain the above-described and other objects, there is provided an opening shield plate comprising a resin opening shield member bonded to an outer circumference of an aluminum terminal and an aluminum opening shield member bonded to the resin opening shield member characterized in that the resin opening shield member is made of PFA (tetrafluoroethylene-perfluoroalkylvinylether) resin, and the aluminum opening shield member is welded to a capacitor case.

In the opening shield plate provided with the above-described arrangement according to the present invention, first, the aluminum made opening shield member is bonded to the outer circumference of the resin made opening shield member, and at the same time, the aluminum made opening shield member is welded to the capacitor case. Accordingly, if the aluminum made opening shield member is welded to the capacitor case when the opening shield plate is mounted in place, there is no room for any gap to be generated between the two components, thus, it is possible to prevent the electrolyte from leaking from the interface between the two components even if any packing is not interposed between the two components.

Further, the PFA resin that has been selected for the resin made opening shield member has an anti-chemical property as its characteristic. Also, a sort of chemical bond is generated on the bonded interface with the aluminum to exhibit the excellent bondability. Accordingly, since the bondability between the resin made opening shield member and the aluminum terminal is strengthened on the basis of the characteristics of the PFA resin, it is thus possible to prevent any gap from being formed between the two components.

Accordingly, the present invention can obtain the following advantages. Namely, in the opening shield plate provided with the above-described arrangement, first, the aluminum made opening shield member is bonded to an outer circumference of the resin made opening shield member which is bonded to the outer circumference of the aluminum terminal, and the aluminum made opening shield member is welded to the capacitor case. Accordingly, even if any packing is not interposed between the two components as in the conventional technology, it is possible to completely seal the interface between the two components, i.e., the opening shield plate and the capacitor case.

Further, the resin made opening shield member is firmly bonded to the aluminum terminal on the basis of the characteristics of the PFA resin which has been selected as the material for the resin made opening shield member. As a result, it is possible to enhance the sealability between the two components without forming any gap between the two components 2 to thereby enhance the sealability therebetween.

Accordingly, from the foregoing advantages, it is possible to enhance the sealability between the aluminum terminal and the resin made opening shield member which is a component of the opening shield plate, and between the opening shield plate and the capacitor case, to thereby effectively suppress the leakage of the electrolyte from the interface therebetween. Thus, it is possible to prevent the degradation of the capacitor caused by the leakage of the electrolyte.

BRIEF DESCRIPTION OF THE DRAWINGS

The features, advantages and resultant effects will now become apparent from the following description in conjunction with the accompanying drawings.

DESCRIPTION OF THE PREFERRED EMBODIMENTS

An embodiment of the present invention will now be described with reference to the accompanying drawings.

Figure 1:
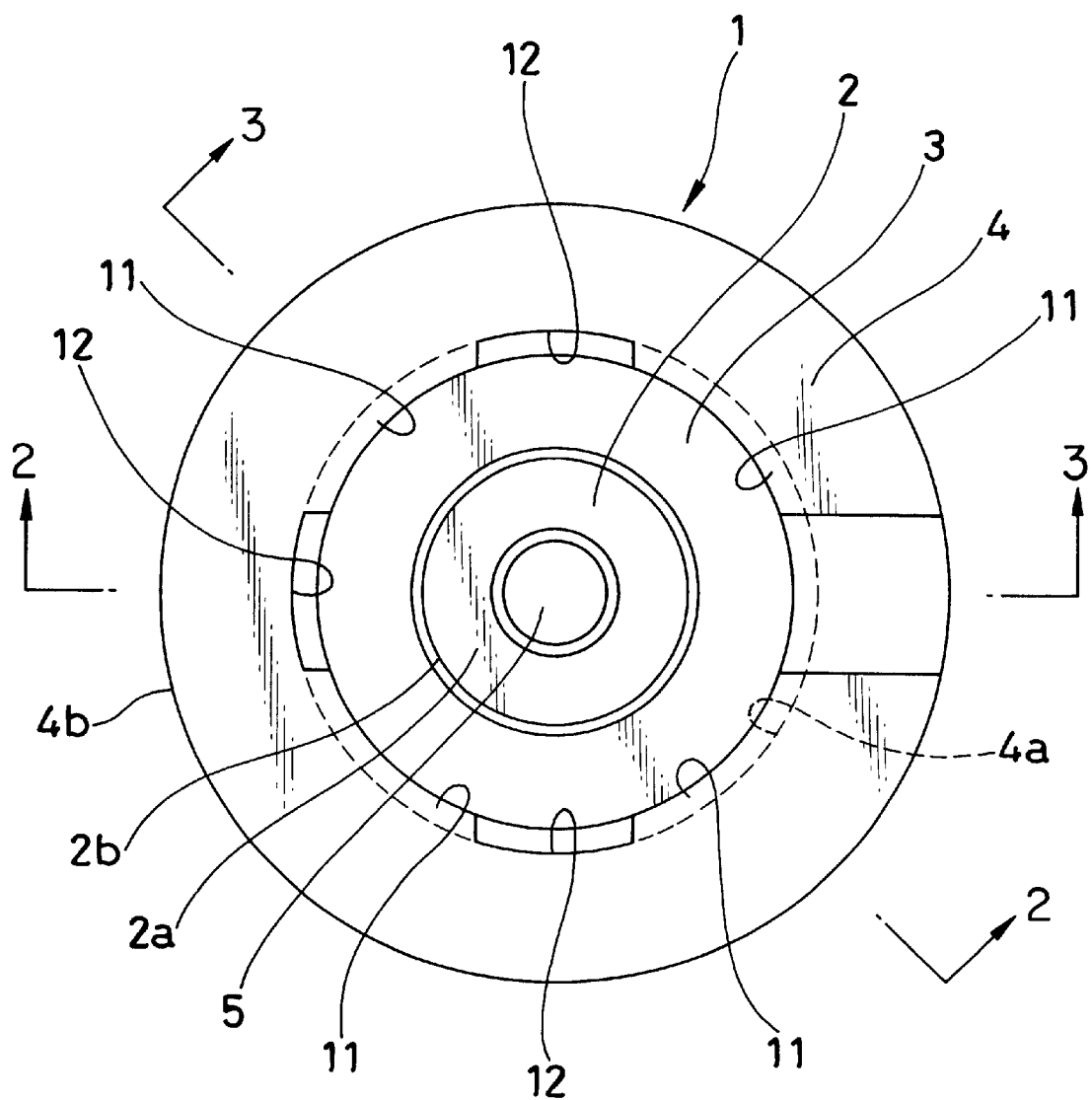
FIG. 1 is a plan view of an opening shield plate in accordance with an embodiment of the present invention.
Figure 2:
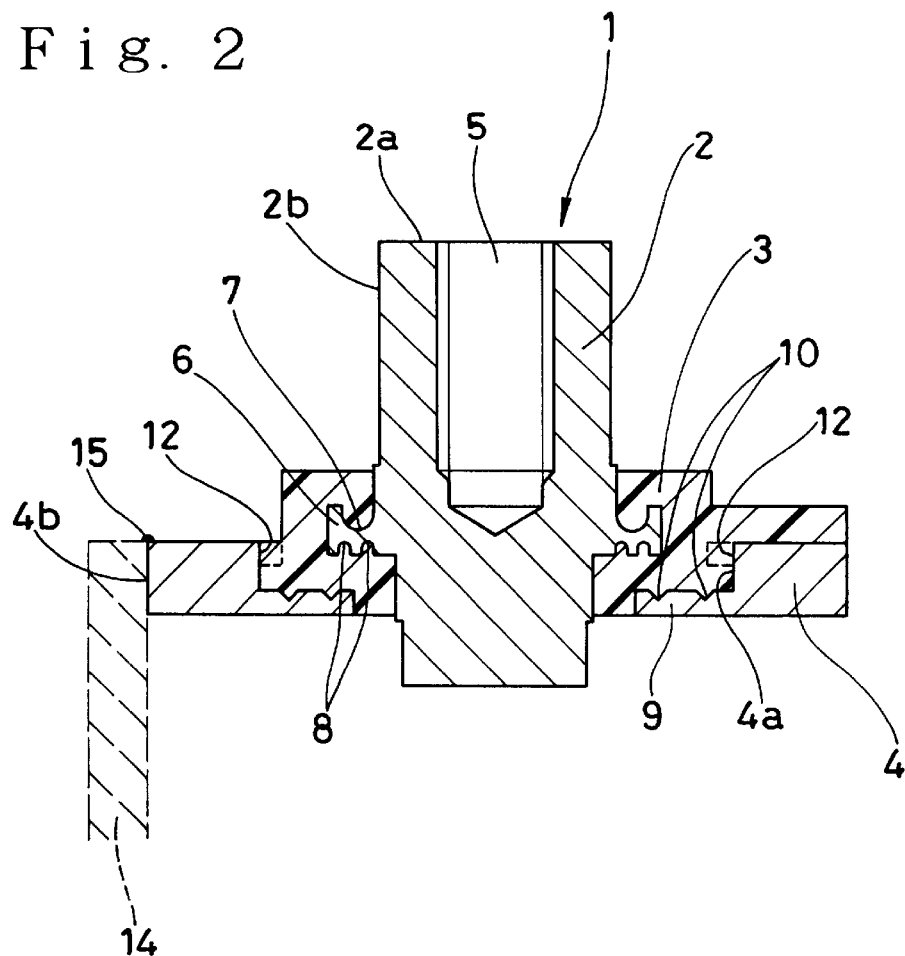
FIG. 2 is a cross-sectional view taken along the line 2—2 of FIG. 1.
Figure 3:
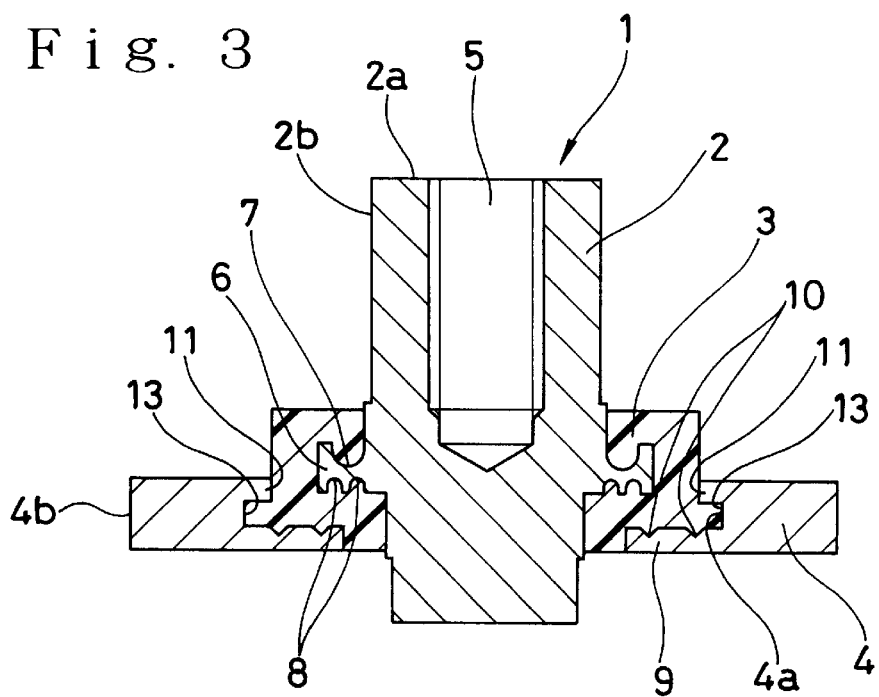
FIG. 3 is a cross-sectional view taken along the line 3—3 of FIG. 1.
Figure 4:
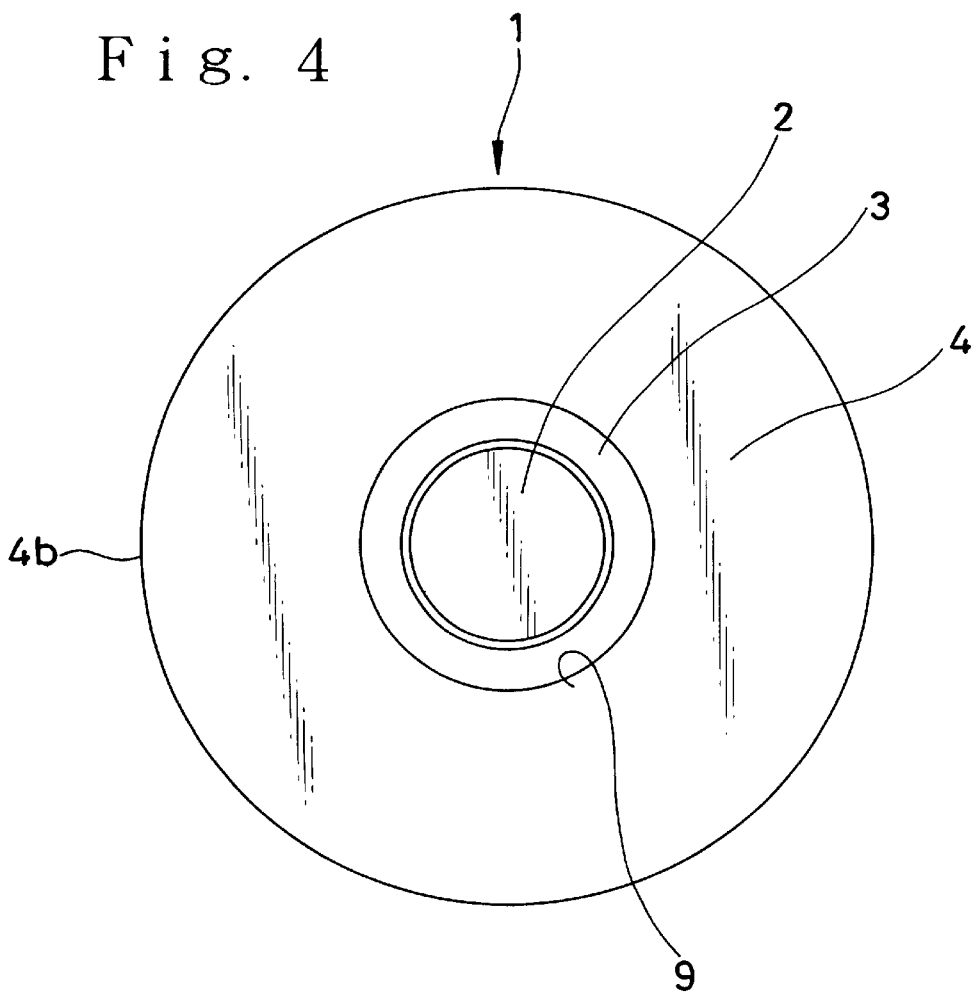
FIG. 4 is a bottom view of the opening shield plate.

FIG. 1 shows a plan view of an opening shield plate 1 in accordance with the present invention. FIG. 2 is a cross-sectional view taken along the line 2—2 of FIG. 1. FIG. 3 is a cross-sectional view taken along the line 3—3 of FIG. 1. FIG. 4 is a bottom view thereof.

First, the opening shield plate 1 in accordance with this embodiment is provided with an aluminum terminal (also called an aluminum electrode or an inner circumferential insert part) 2 substantially in the form of a cylinder. An annular resin made opening shield member 3 made of PFA resin is bonded by an insert molding to an outer circumference of this aluminum terminal 2. Furthermore, an aluminum made opening shield member (also called an outer circumferential insert part) 4 in the form of a ring and a plate is bonded in the same manner by the insert molding to an outer circumference of this resin made opening shield member 3.

A screw portion 5 which is open to its top surface 2a for connection with a wiring is provided with the aluminum terminal 2. Also, an annular flanged portion 6 is formed integrally with the outer circumferential surface 2b of the screw portion 5. A predetermined number (one in the drawing) of annular engagement groove 7 is provided on the top surface of the flanged portion 6. Also, a predetermined number (two in the drawing) of relatively small annular engagement grooves 8 are formed on the bottom surface of the flanged portion 6. The engagement groove 7 of the upper surface of the flanged portion 6 is formed in the form of a semicircular shape in cross-section, and also the engagement grooves 8 of the bottom surface of the flangedportion 6 are formed in the form of a semicircular in cross-section.

An annular flanged portion 9 is provided radially inwardly and in a projecting manner from inner circumferential surface 4a of the aluminum made opening shield member 4 on a circumferential portion of a lower end opening portion of the inner circumferential surface 4a of the aluminum made opening shield member 4. A predetermined number (two in the drawing) of annular engagement grooves 10 are provided on a top surface of this flanged portion 9. The cross-section of the engagement grooves 10 is in the form of a triangular shape. An inside diameter dimension of the flanged portion 9 is set to be smaller than an outside diameter dimension of the flanged portion 6, and the inner circumiferential end portion of the flanged portion 9 is disposed below the outer circumferential edge portion of the flanged portion 6 so that the flanged portion 9 and the flanged portion 6 are arranged to be at least partially overlapped with each other in the radial direction.

Also, a predetermined number (four in the drawing) of engagement projections 11 are provided at an equal interval to project radially and inwardly from the circumferential edge portion of the upper end opening of the inside circumferential surface 4a. An inner diameter dimension of these engagement projections 11 (i.e., an distance between the opposite projections 11 provided diametrically at 180 degrees) is set to be larger than the outside diameter dimension of the flanged portion 6. These engagement projections 11 are disposed on the outer circumferential side of the flangedportion 6. As a result, the engagement projections 11 and the flanged portion 6 are at least partially overlapped with each other.

Recesses 12 are provided between the adjacent engagement projections 11 so as to be arranged alternatively in the circumferential direction with the engagement projection 11. Recesses 13 arealsoprovidedbetweentheengagementprojections 10 and the flanged portion 9.

The aluminum terminal 2 and the resin made opening shield member 3, and the resin made opening shield member 3 and the aluminum made opening shield member 4 are bonded by the insert molding as described above to be integrated with each other, respectively. And, by performing this insert molding, the flanged portion 6 of the aluminum terminal 2, the flanged portion 9 of the aluminum made opening shield member 4 and the engagement projections 11 are embedded within the thickness portion of the resin made opening shield member 3, respectively (although the lower surface of the flanged portion 9 and the top surface of the engagement projections 11 are exposed to the outside). The respective engagement grooves 7, 8, and 10 and the recesses 12 and 13 are filled in part with PFA resin constituting the resin made opening shield member 3.

Accordingly, first, the resin is fille d in the recess 13 between the engagement projections11and the flanged portion 9 of the aluminum made opening shield member 4 so that the resin made opening shield member 3 is engaged with the flanged portion 9 and/or the engagement projections 11 in the axial direction (in the up-and-down direction in FIG. 2). Accordingly, the resin made opening shieldumember 3 is prevented frombeing pulled apart from the aluminum made opening shield member 4. And, since the recess between the engagement projections 11 is filled with the resin so that the resin made opening shield member 3 is engaged with the engagement projections 11 in the circumferential direction, the resin made opening shield member 3 is prevented from being pulled apart from the aluminum made opening shield member 4. Further as the resin is filled in each engagement groove 10 of the aluminum made opening shield member 4 so that the resin made opening shield member 3 is engaged with each engagement groove 10, even if there is a difference in thermal expansion rate, thermal transfer rate or the likebetween the two components 3 and 4, the gap would not be readily generated between the two components 3 and 4. In the same manner, as each engagement groove 7, 8 of the aluminum terminal 2 is filled with the resin so that the resin made opening shield member 3 is engaged with each engagement groove 7, 8 even if there is a difference in thermal expansion rate, thermal transfer rate or the like between the two components 2 and 3, the gap would not be readily generated between the two components 2 and 3.

Also, as shown in FIG. 2, the opening shield plate 1 is fixed to the capacitor case 14 by welding the aluminum made opening shield member 4 to the circumferential portion of the upper end opening of the capacitor case 14 with the outer circumferential edge portion 4b. The capacitor case 14 which is the counterpart of welding is made of aluminum. Accordingly, the aluminum components are fixedly welded with each other over the entire circumference of the capacitor case 14 and the opening shield plate 1. In the drawing, reference numeral 15 denotes the welded part.

First of all, in the opening shield plate 1 provided with the above-described arrangement, the aluminum made opening shield member 4 is first bonded to the further outer circumference of the resin made opening shield member 3 bonded to the outer circumference of the aluminum terminal 2. At the same time, the aluminum made opening shield member 4 is fixedly welded to the circumferential edge portion of the upper end opening of the aluminum made capacitor case over the outer circumferential edge portion 4b. Even if the packing that is likely to be deteriorated due to the contact with the electrolyte liquid in the conventional technology is not provided, the interface between the two components 4 and 14, i.e., the interface between the opening shield plate 1 and the capacitor case 14 may be completely sealed. Accordingly, it is possible to first prevent the electrolyte liquid from leaking from the interface between the opening shield plate 1 and the capacitor case 14 to the outside.

Also, as described above, the PFA resin that is selected as the material of the resin made opening shield member 3 has an anti-chemical property that may stand the electrolyte liquid. At the same time, the PFA resin has characteristics to exhibit the bondability that is superior as a result of the chemical bond on the bonded interface with the aluminum. Accordingly, the resin made opening shield member 3 is firmly bonded to the aluminum terminal 2 on the basis of the characteristics of the PFA resin. Accordingly, in addition to the enhancement of the bondability between the aluminum terminal 2 and the resin made opening shield member 3 by the formation and the embedment of the flanged portion 6, the bondability between the two components 2 and 3 is further enhanced by the adaptation of the PFA resin. As a result, it is possible to enhance the sealablity between the two components 2 and 3 without any gap to be caused between the two components 2 and 3. Thus, it is possible to prevent the electrolyte liquid from leaking out betweenthe aluminum terminal 2 and the resin made opening shield member 3.

Also, for the same reason, anygap is not generated between the resin made opening shield member 3 and the aluminum made opening shield member 4 and it is possible to enhance the sealability between the two components 3 and 4. Accordingly, also possible to prevent the electrolyte liquid from leaking out between the resin made opening shield member 3 andthe aluminum made opening shield member 4.

Accordingly, based upon the foregoing reasons, in accordance with the opening shield plate 1 provided with the above-described arrangement, it is possible to enhance the bondability or the sealability between the resin made opening shield member 3 and the aluminum terminal 2 and the opening shield plate 1 and the capacitor case 14, and at the same time it is possible to keep the bondability or the sealability between the resin made opening shield member 3 and the aluminum made opening shield member 4. Thus, it is possible to effectively prevent the electrolyte from leaking out between the interfaces, and to prevent the degradation of the capacitor performance caused by the leakage of the electrolyte.

Also, since the aluminum made opening shield member 4 is welded to the capacitor case 14, even if the pressure within the case 14 is applied to the aluminum made opening shield member 4, the aluminum made opening shield member 4 is no longer removed from the case 14. Also, since the resin made opening shield member is engaged with the engagement projections 11 of the aluminum made opening shield member 4, even if the pressure within the case 14 is applied to the resin made opening shield member 3, the resin made opening shield member 3 is no longer removed away from the aluminum made opening shield member 4. Furthermore, since the flanged portion 6 of the aluminumterminal 2 is embedded in the resin made opening shield member 3, even if the pressure within the case 14 is applied to the aluminum terminal 2, the aluminum terminal 2 is no longer removed away from the resin made opening shield member 3. Accordingly, there is no fear that any component is removed by the pressure within the case 14 and the bond comes off. Further, by the rotation preventing structure, the resin made opening shield member 3 is prevented from rotating relative to the aluminum made opening shield member 4, and if the rotational torque is applied to the joint portion between the two components 3 and 4 upon connecting the wire, there is no fear that the two components would be separated from each other.

Figure 5:
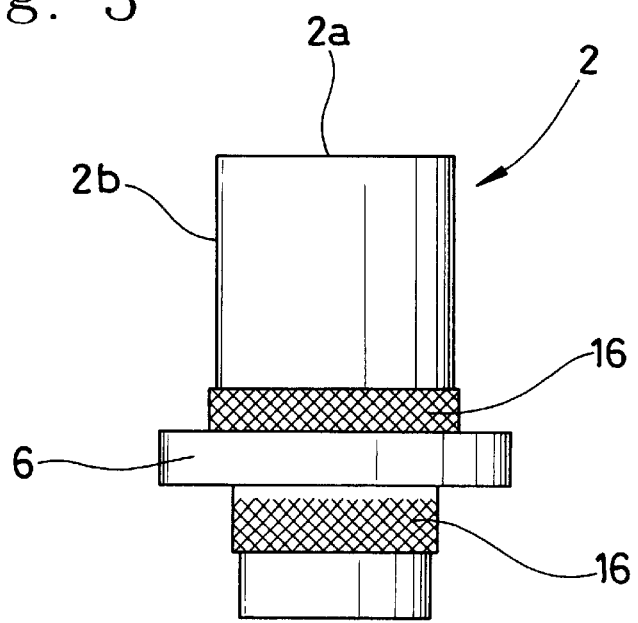
FIG. 5. is a front view of an aluminum terminal to which a knurl is applied.
Figure 6:
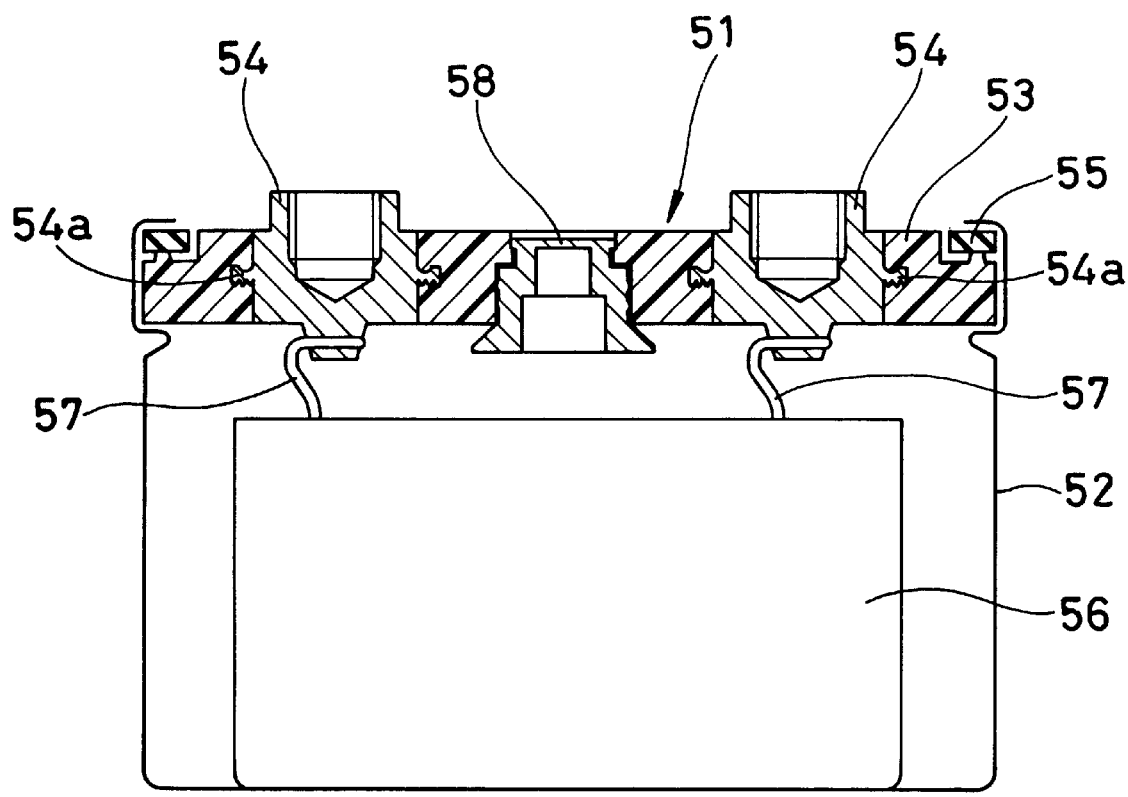
FIG. 6 is a cross-sectional view showing a state at which a conventional opening shield plate is mounted.

Incidentally, as shown in FIG. 5, if a cross knurl (also referred to as a knurl mesh) is applied to the outer circumferential surface 2b of the aluminum terminal integrally formed with the flanged portion 6, it is possible to further enhance the bondability between the aluminum terminal 2 and the resin made opening shield member 3. Namely, a knurl 16 is applied to the outer circumferential surface 2b of the aluminum terminal 2, the knurl 16 is engaged in the circumferential direction relative to the resin made opening shield member 3, it is possible to prevent the aluminum terminal 2 from rotating relative to the resin made opening shield member 3. Further, since an interface between the aluminum terminal 2 and the resin made opening shield member 3 is roughened so that the permeation path of the electrolyte comes to be complicated. Accordingly, the electrolyte would hardly permeate into the interface between the two components 2 and 3. The knurl may be applied on the outer circumferential surface of the flanged portion 6.

Various details of the invention may be changed without departing from its spirit nor its scope. Furthermore, the foregoing description of the embodiments according to the present invention is provided for the purpose of illustration only, and not for the purpose of limiting the invention as defined by the appended claims and their equivalents.

What is claimed is:

1. An opening shield plate for attachment to a capacitor case which comprises:

an aluminum terminal which defines an outer circumference, an inner annular member positioned around said aluminum terminal and bonded thereto, said inner annular member defining an outer circumference and being made of tetraflouroethylene-perfluoroalkylvinylether, and an outer annular member positioned around said inner annular member and bonded thereto, said outer annular member being made of aluminum.

2. An electrolyte capacitor which comprises:

a capacitor case defining an upwardly open rim, a shield plate comprising:

an aluminum terminal which defines an outer circumference, an inner annular member positioned around said aluminum terminal and bonded to said outer circumference and bing made of tetraflouroethylene-perfluoroalkylvinylether, and an outer annular member positioned around said inner annular member and bonded thereto, said outer annular member being made of aluminum, said outer annular member being welded to said upwardly open rim of said capacitor case.

* * * * *